(12) United States Patent
Cheng

(10) Patent No.: US 8,012,022 B2
(45) Date of Patent: Sep. 6, 2011

(54) BUTTON STRUCTURE FOR GAME CONTROLLER

(76) Inventor: Chiu-Hao Cheng, Chungho (TW)

( * ) Notice: Subject to any disclaimer, the term of this patent is extended or adjusted under 35 U.S.C. 154(b) by 1020 days.

(21) Appl. No.: 11/808,438

(22) Filed: Jun. 11, 2007

(65) Prior Publication Data

US 2007/0243933 A1   Oct. 18, 2007

Related U.S. Application Data

(63) Continuation-in-part of application No. 10/625,983, filed on Jul. 23, 2003, now abandoned.

(51) Int. Cl.
  *G06F 17/00* (2006.01)
(52) U.S. Cl. .......................................... 463/37
(58) Field of Classification Search .............. 463/36, 463/37; 345/157, 173
  See application file for complete search history.

(56) References Cited

U.S. PATENT DOCUMENTS

| | | | | |
|---|---|---|---|---|
| 4,257,305 A * | 3/1981 | Friend et al. | ..................... | 84/690 |
| 5,632,679 A * | 5/1997 | Tremmel | ......................... | 463/36 |
| 5,818,037 A * | 10/1998 | Redford et al. | ................ | 250/229 |
| 6,313,826 B1 * | 11/2001 | Schrum et al. | ................. | 345/161 |
| 6,787,865 B2 * | 9/2004 | Endo et al. | ..................... | 257/414 |
| 6,809,529 B2 * | 10/2004 | Okada et al. | .................. | 324/681 |
| 7,499,025 B2 * | 3/2009 | Endo et al. | ..................... | 345/157 |
| 2005/0225423 A1 * | 10/2005 | Hsu | ................................ | 338/47 |

* cited by examiner

*Primary Examiner* — Ronald Laneau

(74) *Attorney, Agent, or Firm* — Bacon & Thomas, PLLC

(57) ABSTRACT

A button structure used in a game controller in which the dimension of the contact area between a metal conducting portion and a continual resistor strip or continual carbon film is determined to control the value of the output signal subject to the biasing angle of the button or the value of pressure applied to the button.

5 Claims, 14 Drawing Sheets

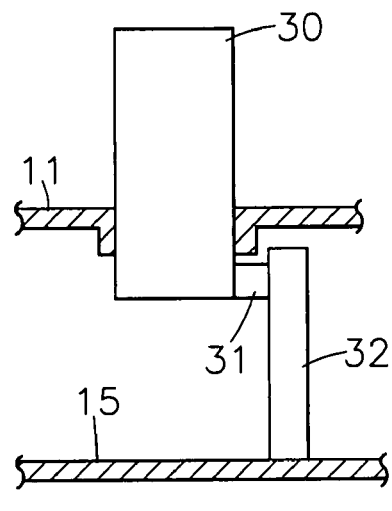
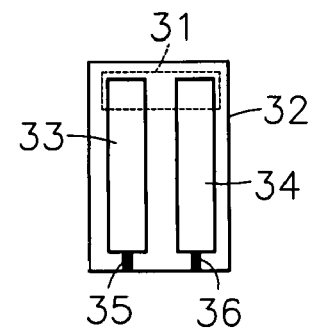
*FIG.2A*      *FIG.2B*
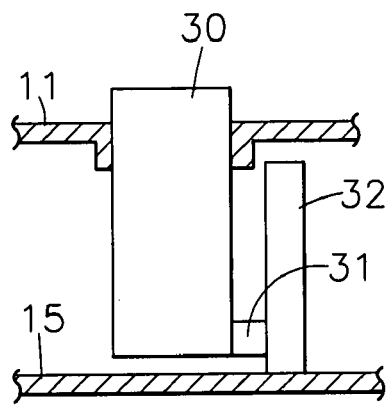
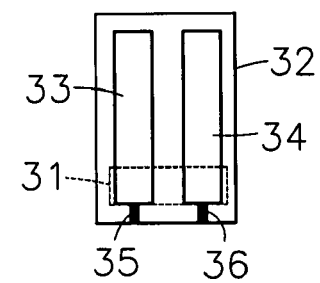
*FIG.2C*      *FIG.2D*

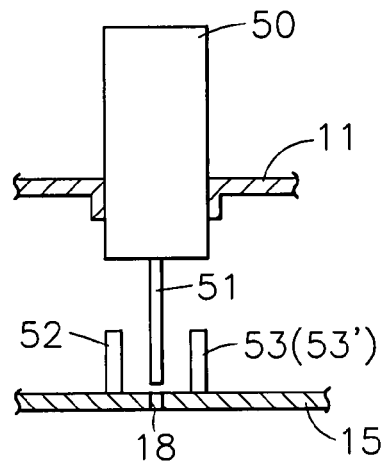
FIG. 6A
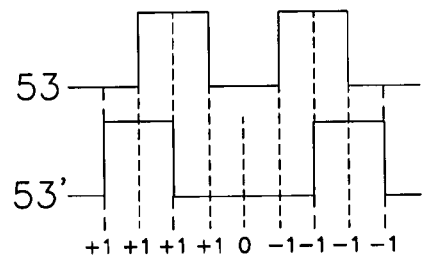
FIG. 6B
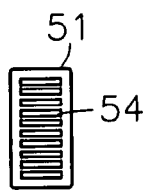 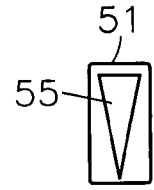
FIG. 6C  FIG. 6D

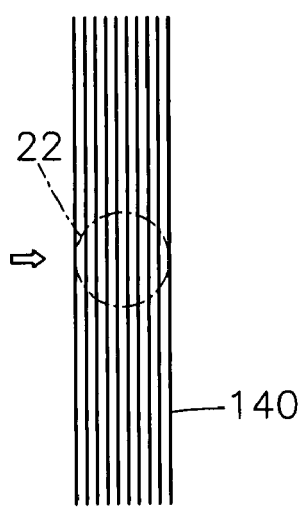 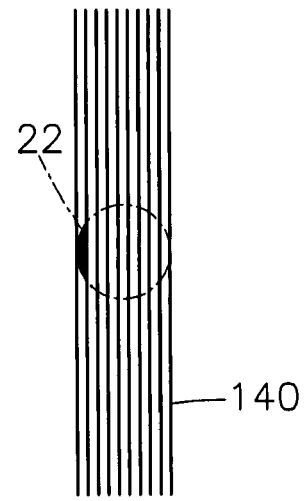
*FIG. 15A*  *FIG. 15B*
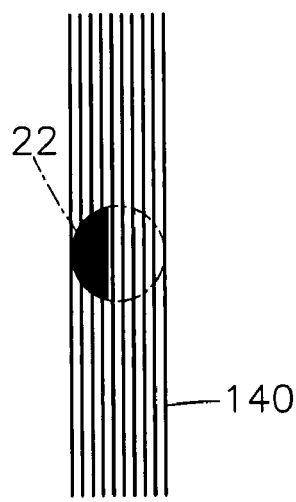 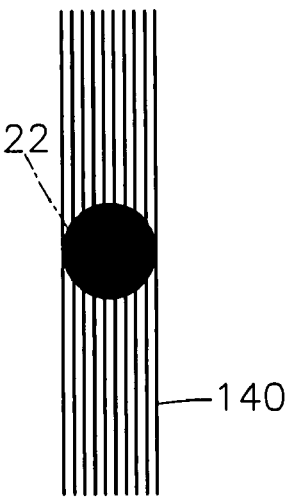
*FIG. 15C*  *FIG. 15D*

BUTTON STRUCTURE FOR GAME CONTROLLER

This application is a Continuation-In-Part of my patent application Ser. No. 10/625,983, filed on Jul. 23, 2003 now abandoned.

BACKGROUND OF THE INVENTION

1. Field of the Invention

The present invention relates generally to a game controller and more particularly, to a button structure used in a game controller, which controls the value of the output signal subject to the contact area between a metal conducting portion and a continual resistor strip or continual carbon film that is controlled subject to the biasing angle of the button or the value of the pressure applied to the button.

2. Description of the Related Art

Following fast development of computer game technology, video games have the characteristics of high resolution, high precision, and high control level. All manufacturers for game machines and related parts are trying hard to improve game precision performance.

FIG. 1A is a top plain view of a game controller 10' according to the prior art. As illustrated, the game controller comprises a frame shell 11', and a plurality of key switch buttons 12' and a cross button 18' mounted on the frame shell 11'. As shown in FIG. 1B, each key switch button 12' is vertically movably mounted is a hole on the frame shell 11' and supported on a rubber member (rubber cone) 13' at a printed circuit board 15'. The rubber member 13' has a metal conductor 14' fixedly disposed on the inside and spaced above two metal contacts 16' and 17' at the printed circuit board 15'. When the button 12' is not pressed, as shown in FIG. 1B, the metal conductor 14' is kept spaced above the metal contacts 16' and 17'. When the button 12' is pressed, as shown in FIG. 1C, the metal conductor 14' is forced into contact with the metal contacts 16' and 17', causing the printed circuit board to output a digital control signal for game control. The rubber member (rubber cone) 13' returns to its former shape when the applied force is disappeared, and therefore the button 12' is retuned to its former position by the rubber (rubber cone) 13'.

The method of the aforesaid prior art design in which one digital signal is outputted upon each press of each button 12' of the game controller 10' by the player cannot satisfy the variable operation feature of a sophisticated game software problem. Similarly, the aforesaid cross button 18 outputs a corresponding digital signal when the up, down, left, or right button is pressed.

FIG. 18 is a schematic circuit block diagram of a touch-control game controller according to the prior art. According to this design, the touch-control game controller comprises a plurality of control points 80 and 81, a touch sensitive circuitry 82, a ciagonal control circuitry 83, and a computer interface circuitry 84. The control points 80 and 81 are to be selectively triggered by the player's finger 85. The ciagonal control circuitry 83 and the computer interface circuitry 84 are adapted to detect the impedance of the player's finger(s) 85 touching the control points 80 and 81. The touch sensitive circuitry 82 is adapted to scan triggering of one single control point. The ciagonal control circuitry 83 is adapted to scan triggering of multiple control points (for example, for controlling oblique movement of a role in the game). When the player touches one or multiple control points with one or multiple fingers 85, the touch sensitive circuitry 82 or ciagonal control circuitry 83 is induced to output a corresponding control signal to the game machine main unit through the computer interface circuitry 84. However, because the area and elasticity of the finger pads of different users or the value of electrical charges carried in the finger pads of different users are different, the game controller may be unable to define every instruction give by the player precisely. Further, when playing an exciting game or shooting game, the sweat of the finger that touches one or multiple control points may cause a contact error, or shorten the working life of the game controller.

Therefore, it is desirable to provide a button structure for game controller that eliminates the aforesaid problems.

SUMMARY OF THE INVENTION

The present invention has been accomplished under the circumstances in view. It is the main object of the present invention to provide a button structure for game controller, which controls the value of the output signal to increase the control variation of the game controller by means of changing the biasing angle of the button or the pressure applied to the button to control the contact area between a metal conducting portion and a resistor or conducting track at the circuit board.

It is another object of the present invention to provide a button structure for game controller, which uses a continual carbon film or continual resistor strip to substitute for a conventional resistor, simplifying the tolerance test.

It is still another object of the present invention to provide a button structure for game controller, which uses a continual carbon film or continual resistor strip to substitute for a conventional non-continual resistor strip, so that all buttons in the game controller show an uniformity in triggering performance, i.e., when different buttons of the game controller receive a same pressure, they provide an approximately equal output value.

It is still another object of the present invention to provide a button structure for game controller, which uses a continual resistor strip or continual carbon film to substitute for a conventional non-continual resistor, for enabling the player to control the value of the output signal by biasing the button or changing the pressure applied to the button to change the contact area between the metal conducting portion and the continual resistor strip or carbon film, assuring high sensitivity and high reliability and eliminating the drawbacks of low sensitivity and low reliability due to the effect of sweat as encountered in the prior art design.

BRIEF DESCRIPTION OF THE DRAWINGS

FIG. 2A is a sectional view of a button structure for game controller in accordance with a first embodiment of the present invention.

FIG. 2B is a schematic sectional view of a part of FIG. 2A, showing the contact of the button at the initial position.

FIG. 2C is similar to FIG. 2A but showing the button pressed.

FIG. 2D is similar to FIG. 2B but showing the contact of the button lowered to the lower limit position.

FIG. 6A is a schematic sectional view of a button structure used in a game controller according to a third embodiment of the present invention.

FIG. 6B is a schematic drawing showing an example of signal output after pressing of the button of the button structure according to the third embodiment of the present invention.

FIG. 6C is a schematic drawing showing the structure of an encoder card for the button structure according to the third embodiment of the present invention.

FIG. 6D shows an alternate form of the encoder card for the button structure according to the third embodiment of the present invention.

FIG. 15A is a schematic drawing showing the relative positioning between the metal conducting portion and the conducting track according to the present invention (I).

FIG. 15B is a schematic drawing showing the relative positioning between the metal conducting portion and the conducting track according to the present invention (II).

FIG. 15C is a schematic drawing showing the relative positioning between the metal conducting portion and the conducting track according to the present invention (III).

FIG. 15D is a schematic drawing showing the relative positioning between the metal conducting portion and the conducting track according to the present invention (IV).

DETAILED DESCRIPTION OF THE INVENTION

Figure 1A:
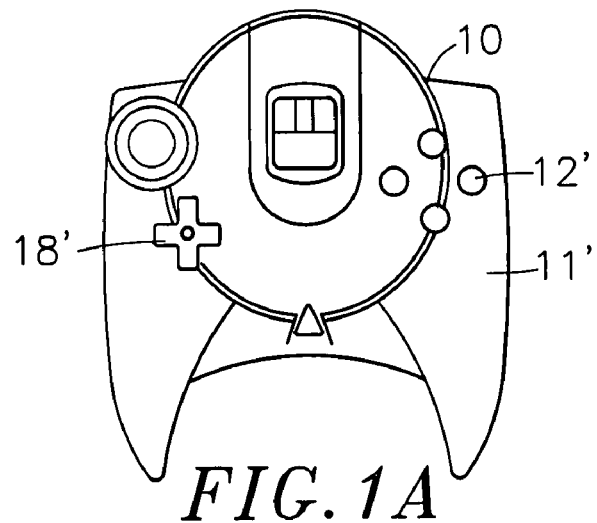
FIG. 1A is a top plain view of a game controller according to the prior art.
Figure 1B:
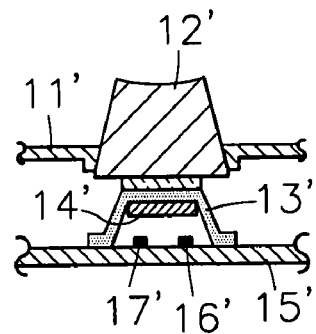
FIG. 1B is a sectional view in an enlarged scale of a part of FIG. 1A.
Figure 1C:
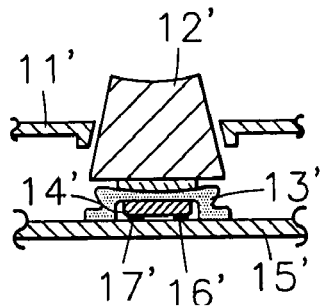
FIG. 1C corresponds to FIG. 1B, showing the button pressed.

Referring to FIGS. 2A~2D, a button 30 is shown having a contact 31 electrically disposed in contact with resistors 33 and 34. The resistors 33 and 34 are installed in a stop member 32 at a circuit board 15. The resistors 33 and 34 have lead wires 35 and 36 for connection to an external circuit. The button 30 is movable along the stop member 32 toward or apart from the circuit board 15 between an upper limit position as shown in FIGS. 2A and 2B and the lower limit position as shown in FIGS. 2C and 2D. The contact 31 is constantly kept in contact with the resistors 33 and 34 to output an analog signal. When the contact 31 is moved with the button 30 along the stop member 32 (the resistors 33 and 34), the impedance of the resistors 33 and 34 is relatively changed subject to the elevational position of the contact 31, and the analog signal outputted by the resistors 33 and 34 is relatively changed.

Figure 3:
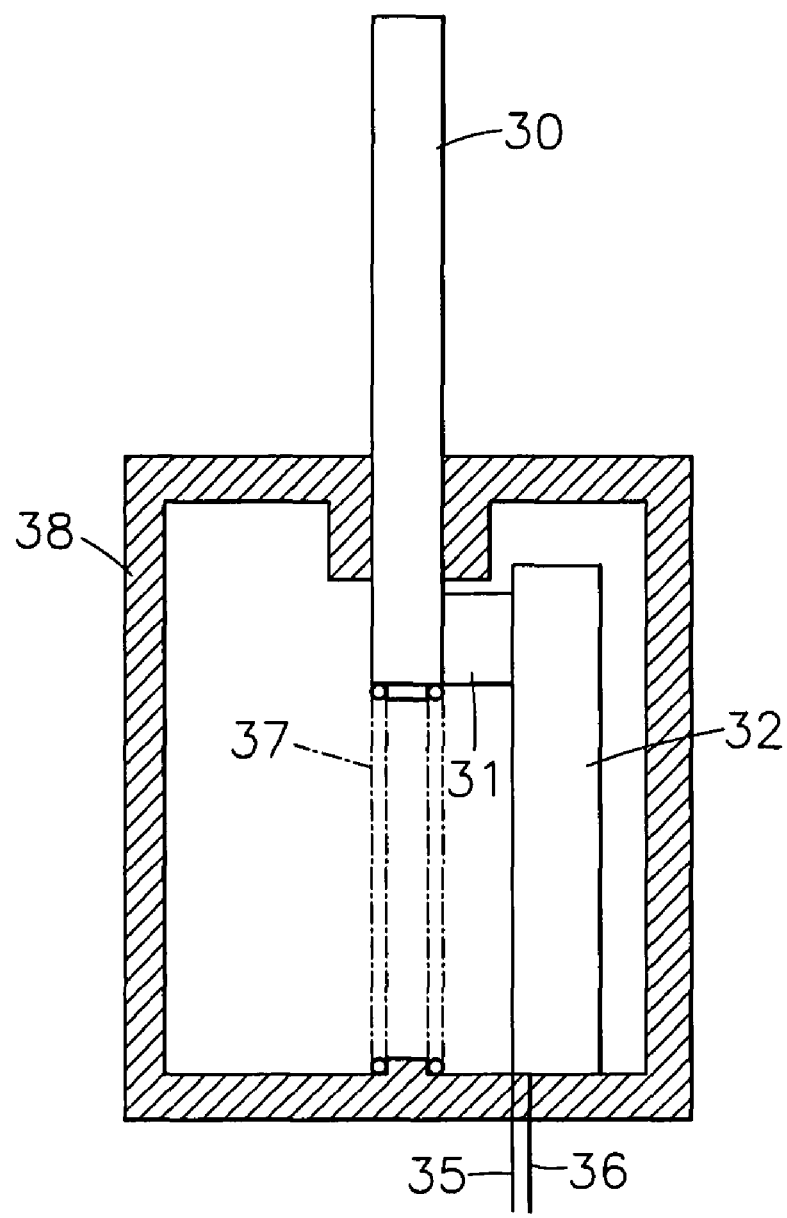
FIG. 3 is a schematic sectional view showing a package shell packaged on the button structure according to the first embodiment of the present invention.

Referring to FIG. 3, the aforesaid stop member 32, resistors 33 and 34 are packaged in a package shell 38. The button 30 is slidably mounted in the shell 38 and partially extending out of the top side of the package shell 38, having its contact 31 suspending inside the package shell 38. The lead wires 35 and 36 of the resistors 33 and 34 extend out of the package shell 38 for connection to an external circuit.

Figure 4:
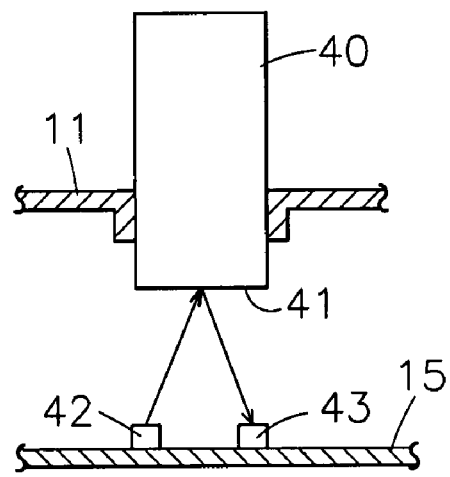
FIG. 4 is a schematic sectional view of a button structure used in a game controller according to a second embodiment of the present invention.

Referring to FIG. 4, a control button 40 is vertically slidably mounted in a frame 11 and spaced above a circuit board 15. The control button 40 has a bottom reflecting surface 41 corresponding to an optical transmitter 42 and an optical receiver 43 at a circuit board 15 below. The optical transmitter 42 is controllable to transmit light toward the bottom reflecting surface 41. The optical receiver 43 is controllable to receive reflected light from the bottom reflecting surface 41. By means of measuring the energy of the reflected light from the bottom reflecting surface 41, the optical receiver 43 detects the position (operation status) of the control button 40 and outputs a corresponding output signal to the circuit board 15 for further control. The control button 40 is supported on spring means (not shown) that automatically returns the control button 40 after the control button is pressed.

Figure 5:
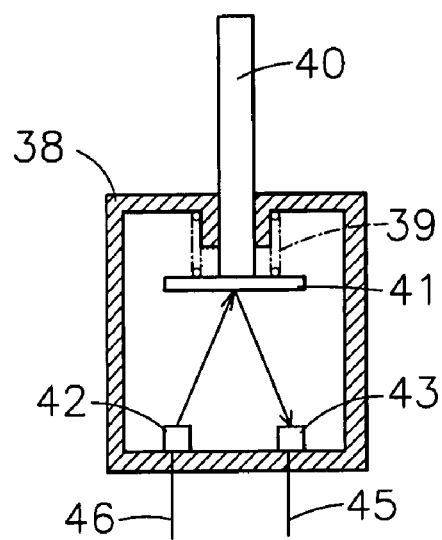
FIG. 5 is a schematic sectional view showing a package shell packaged on the button structure according to the second embodiment of the present invention.

Referring to FIG. 5, this embodiment is substantially similar to the embodiment shown in FIG. 4 with the exception of the shape of the control button 40 and the use of a package shell 38. According to this embodiment, spring means 39 is provided to hold the control button 40 in non-pressed position and to return the control button 40 to the non-pressed position after the control button 40 is pressed. Further, the optical transmitter 42 and the optical receiver 43 have the respective lead wires 45 and 46 respectively extend out of the package shell 38 and connected to an external circuit.

Referring to FIGS. 6A~6C, a circuit board 15 is provided having a through hole 18 cut through the top and bottom walls thereof, and a frame 11 is spaced above the circuit board 15 at a distance to support a button 50. The circuit board 15 has an optical transmitter 52 and two optical receivers 53 and 53' mounted thereon. The optical transmitter 52 is disposed on the top wall of the circuit board 15 at one side relative to the through hole 18. The two optical receivers 53 and 53' are vertically arranged in a line at an opposite side relative to the through hole 18. The button 50 is vertically slidably mounted in the frame 11, having an encoder card 51 downwardly extending from its bottom side and aimed at the through hole 18 of the circuit board 15. The encoder card 51 has a plurality of transverse slots 54 arranged in parallel at different elevations. When the button 50 is not pressed, the optical receivers 53 and 53' measure the light from the optical transmitter 52 directly. When the button 50 is pressed, the optical receivers 53 and 53' measure the light passing from the optical transmitter 52 through the transverse slots 54 of the encoder card 51 and output a corresponding analog signal. Alternatively, the optical receiver 53 can be omitted, i.e., only the optical receiver 53' is used. In this case, the encoder card 51 is made having only one slot 55, which has a width gradually reducing in one direction (see FIG. 6D). For example, the slot 55 can be made having a triangular shape.

Figure 7A:
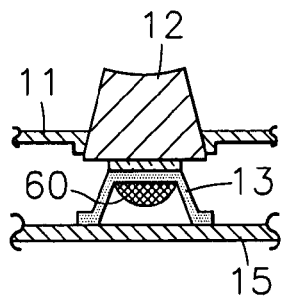
FIG. 7A is a schematic sectional view of a button structure used in a game controller according to a fourth embodiment of the present invention.
Figures 7B, 7C:
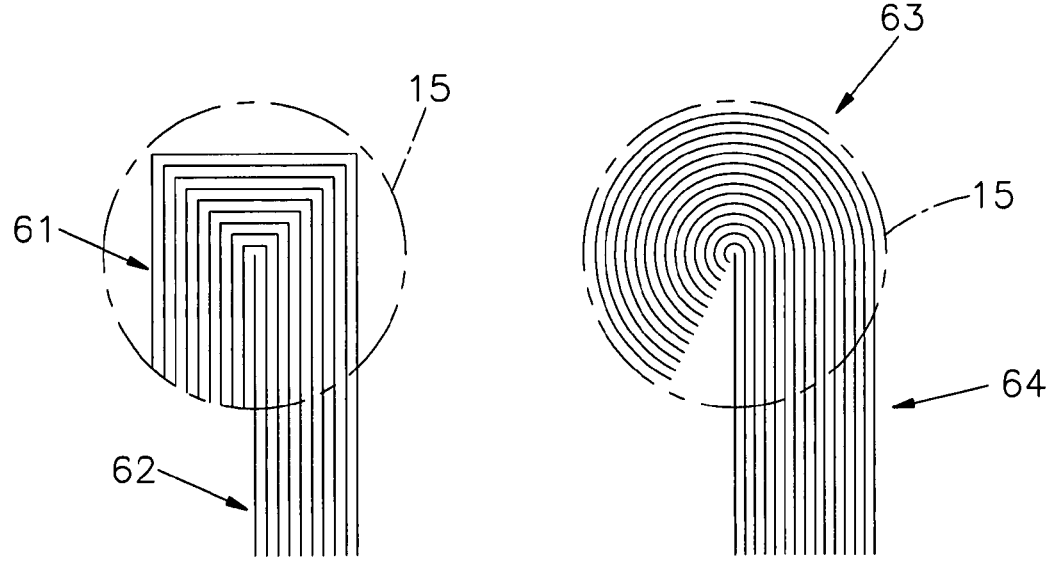
FIG. 7B shows one pattern of the conducting track for the button structure according to the fourth embodiment of the present invention
FIG. 7C shows an alternate form of the conducting track for the button structure according to the fourth embodiment of the present invention.
Figure 8:
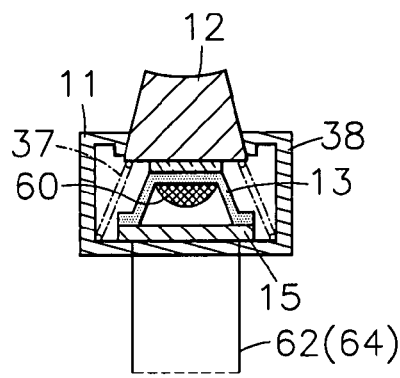
FIG. 8 is a schematic sectional view showing a package shell packaged on the button structure according to the fourth embodiment of the present invention.

Referring to FIGS. 7A~7C, a button 12 is vertically movably mounted in a frame 11 and stopped at a hollow rubber cone 13 at a circuit board 15. The hollow rubber cone 13 has a conical conducting member 60 fixedly mounted on the inside and spaced above a rectangular conducting track 61 (or circular conducting track 63) on a circuit board 15. When the user presses the button 12, the button 12 gives a pressure to the hollow rubber cone 13, forcing the conical conducting member 60 to contact the rectangular conducting track 61 (or circular conducting track 63), thereby producing an analog output signal corresponding to the contact area between the conical conducting member 60 and the rectangular conducting track 61 (or circular conducting track 63), i.e., corresponding to the pressure applied to the button 12. The rectangular conducting track 61 (or circular conducting track 63) has lead wires 62 (or 64) electrically connected to other circuits on the circuit board 15. Further, a package shell 38 may be mounted on the frame 11 to hold the hollow rubber cone 13, the circuit board 15, and the conical conducting member 60 on the inside (see FIG. 8). Further, spring means 37 is mounted inside the package shell 38 to support the button 12 (see FIG. 8). The spring means 37 automatically returns the button 12 after the button 12 is pressed.

Figure 9A:
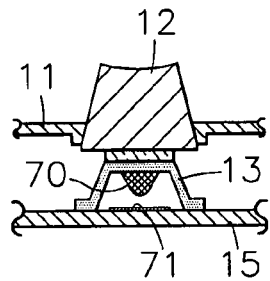
FIG. 9A is a schematic sectional view of a button structure used in a game controller according to a fifth embodiment of the present invention.
Figure 9B:
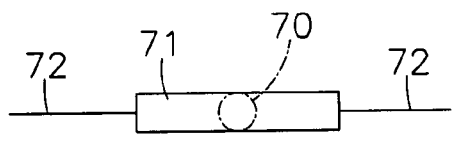
FIG. 9B is a schematic top plain view in an enlarged scale of a part of FIG. 9A before pressing of the button.
Figure 9C:
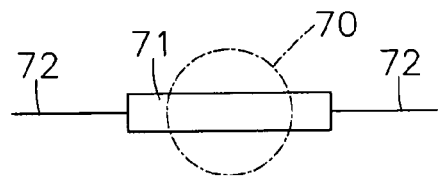
FIG. 9C is similar to FIG. 9b but showing the status after pressing of the button.

Referring to FIG. 9A, a button 12 is vertically movably mounted in a frame 11 and stopped at a hollow rubber cone 13 at a circuit board 15. The hollow rubber cone 13 has a conical conducting member 70 fixedly mounted on the inside and spaced above a carbon film 71 that is printed on a circuit board 15. The carbon film 71 is electrically connected to an external circuit by lead wires 72. When the user presses the button 12, the button 12 gives a pressure to the hollow rubber cone 13, forcing the conical conducting member 70 to contact the carbon film 71. Subject to the pressure applied to the conical conducting member 70 through the button 12 against the carbon film 71, the contact area between the conical conducting member 70 and the carbon film 71 is relatively changed, therefore the impedance of the carbon film 71 and the electric current passing through the carbon film 71 are also relatively changed (see FIGS. 9B and 9C, providing a corresponding analog output signal indicative of the applied pressure.

Figure 10:
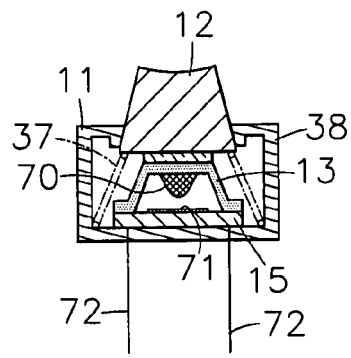
FIG. 10 is a schematic sectional view showing a package shell packaged on the button structure according to the fifth embodiment of the present invention.

FIG. 10 is substantially similar to FIG. 9A. According to this embodiment, a package shell 38 is mounted on the frame 11 to hold the hollow rubber cone 13, the circuit board 15, and the conical conducting member 70 on the inside. Further, spring means 37 is mounted inside the package shell 38 to support the button 12. The spring means 37 automatically returns the button 12 after the button 12 is pressed. The lead wires 72 extend out of the package shell 38 for connection to an external circuit.

Figure 11A:
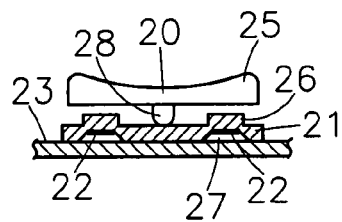
FIG. 11A is a schematic sectional view of a button structure used in a game controller according to a sixth embodiment of the present invention.
Figure 11B:
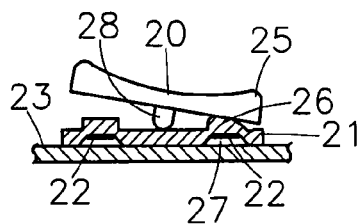
FIG. 11B is similar to FIG. 11A but showing the button biased.
Figure 11D:
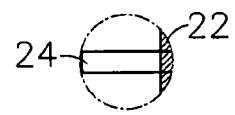
FIG. 11D is a schematic drawing showing one contact status between the metal conducting portion and the resistor according to the sixth embodiment of the present invention.
Figure 11C:
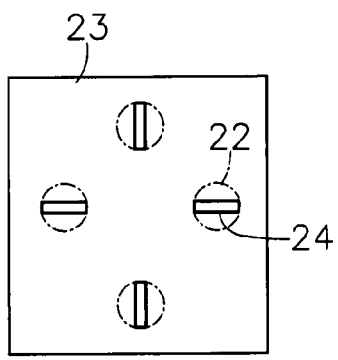
FIG. 11C is a top plain view in an enlarged scale of the button of the button structure according to the sixth embodiment of the present invention.
Figure 11E:
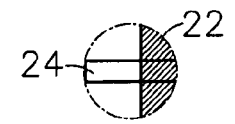
FIG. 11E is a schematic drawing showing another contact status between the metal conducting portion and the resistor according to the sixth embodiment of the present invention.
Figure 11F:
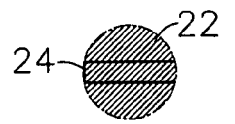
FIG. 11F is a schematic drawing showing still another contact status between the metal conducting portion and the resistor according to the sixth embodiment of the present invention.

Referring to FIGS. 11A and 11B, a circuit board 23 is provided having four resistors 24 arranged on the top wall thereof and spaced from one another at 90-degrees. A rubber member 21 is mounted on the top wall of the circuit board 23 over the area of the resistors 24. The rubber member 21 comprises four bottom recesses 27, four metal conducting portions 22 respectively fixedly mounted in the four bottom recesses 27 and respectively and vertically aimed at the resistors 24, and four protruding portions 26 protruded from the top side corresponding to the metal conducting portions 22. A cross button 20 is provided having a bottom center shaft 28 pivoted to the center of the rubber member 21 and four press button portions 25 equiangularly spaced around the border area corresponding to the protruding portions 26. When biasing the cross button 20, one press button portion 25 is forced against the corresponding protruding portion 26 to press the associating metal conducting portion 22 against the corresponding resistor 24, producing an output signal indicative of the biasing direction of the cross button 20 and the pressured applied (see FIGS. 11C~11F). The technical features of this embodiment are applicable to a toggle switch (button).

Figure 12:
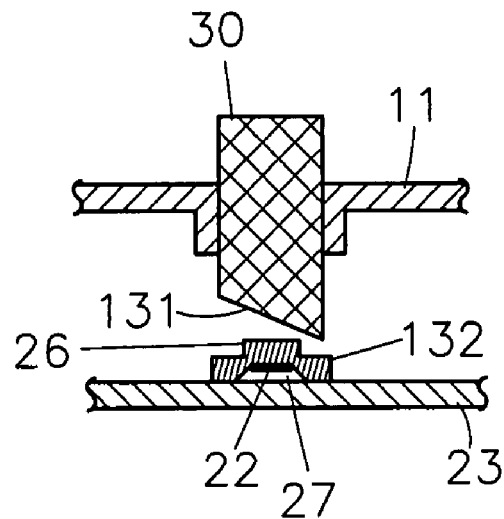
FIG. 12 is a schematic sectional view of a button structure used in a game controller according to a seventh embodiment of the present invention.

Referring to FIG. 12, a circuit board 23 is provided having a resistor (not shown) on the top wall. A rubber member 132 is mounted on the circuit board 23. The rubber member 132 has a bottom recess 27, a metal conducting portion 22 fixedly mounted in the bottom recess 27 and aimed at the resistor of the circuit board 23, and a protruding portion 26 protruded from the top side corresponding to the metal conducting portion 22. A frame 11 is provided above the circuit board 23 to support a button 30. The button 30 is vertically slidably mounted in the frame 11, having a beveled bottom edge 131 facing the protruding portion 26. By means of pressing the button 30 to force the beveled bottom edge 131 against the protruding portion 26 of the rubber member 132, the metal conducting portion 22 is forced against the resistor at the circuit board, changing the impedance of the resistor, and therefore a corresponding output signal is produced.

Figure 13:
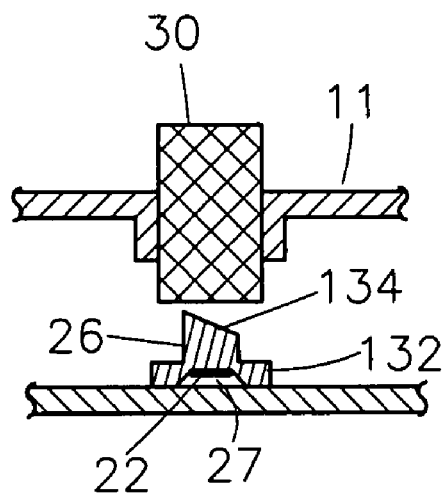
FIG. 13 is a schematic sectional view of a button structure used in a game controller according to an eighth embodiment of the present invention.

FIG. 13 shows a button structure substantially similar to the embodiment shown in FIG. 12 with the exception that the button 30 has a flat bottom edge; the protruding portion 26 has a beveled top edge 134 facing the flat bottom edge of the button 30.

Figure 14:
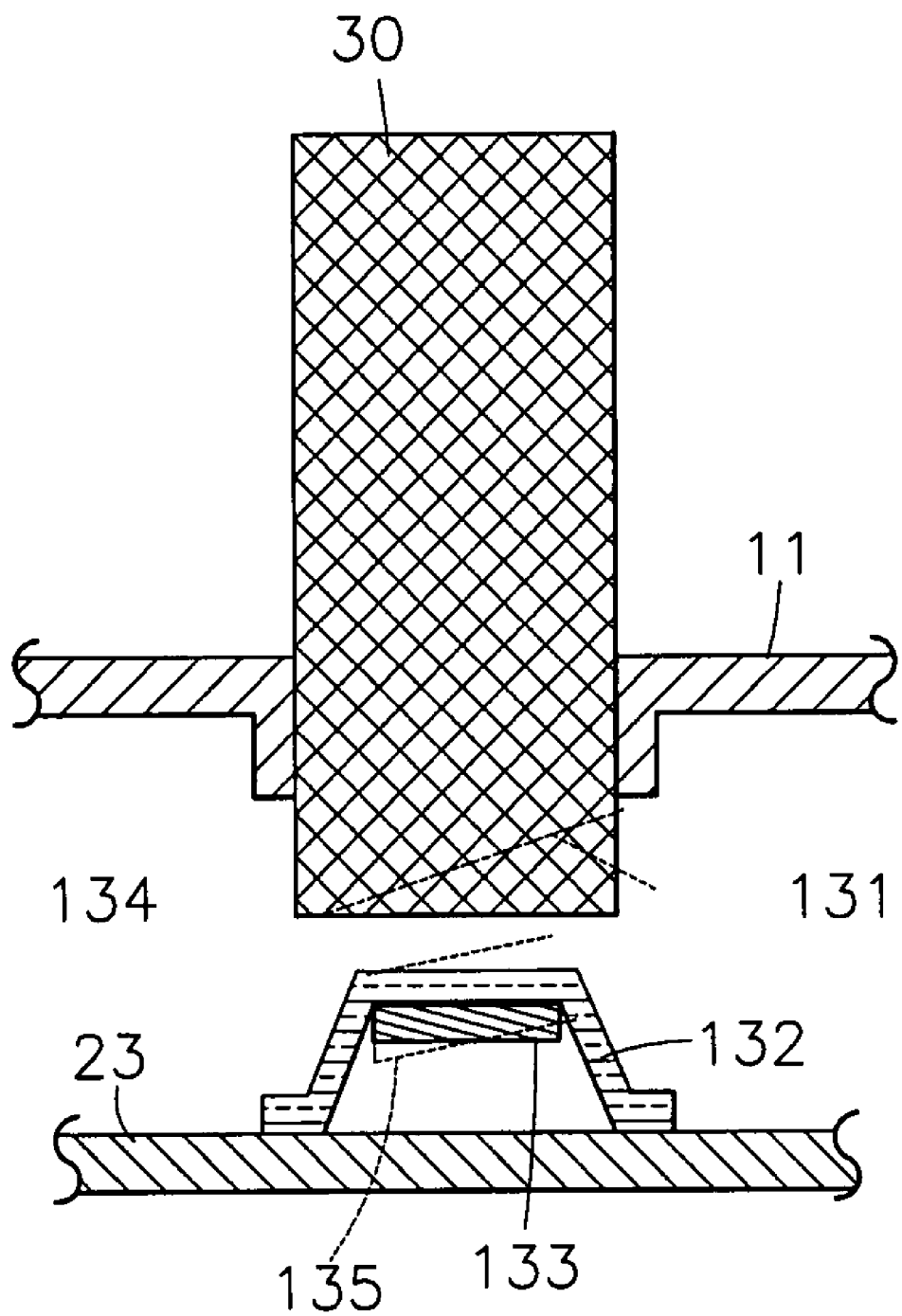
FIG. 14 is a schematic drawing showing many different alternate forms of the button structure according to the aforesaid various embodiments.

Referring to FIG. 14, the button 30 can be made having a beveled bottom edge 131; the rubber member 132 can be made having a beveled top edge 134; the metal conducting portion 133 of the rubber member 132 at the circuit board 23 can be made having a beveled bottom edge 135 facing the resistor (not shown) at the circuit board 23.

Referring to FIGS. 15A~15D, a conducing track 140 may be used to substitute for the aforesaid resistor 24. Subject to the contact area between the metal conducting portion 22 and the conducting track 140, (i.e., subject to the pressure applied to the button), a corresponding output signal is produced.

Figure 16A:
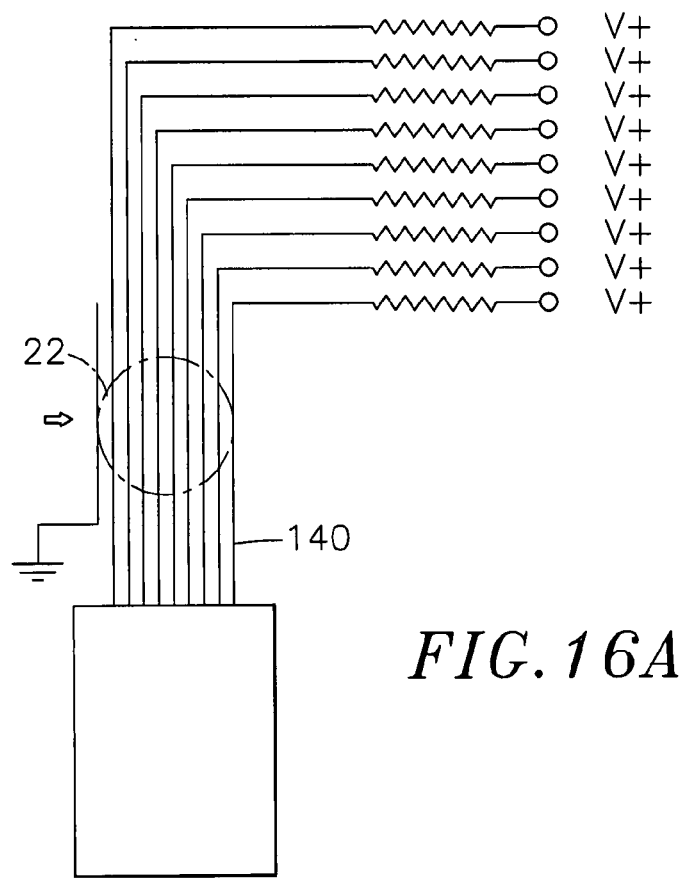
FIG. 16A is a schematic drawing showing the track lines of the conducting track electrically connected to an IC according to the present invention.

Referring to FIG. 16A, the conducting track 140 has the conducting lines thereof electrically connected to an IC that reads in the pressure applied through the metal conducting portion 22 to the conducting track 140.

Figure 16B:
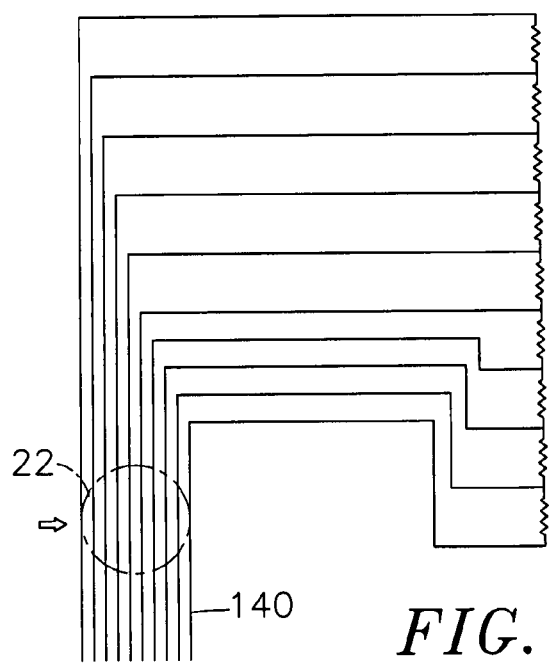
FIG. 16B is a schematic drawing showing the track lines of the conducting track electrically connected to resistors according to the present invention.

Referring to FIG. 16B, the conducting track 140 has the conducting lines thereof electrically connected to resistor means that changes the impedance upon contact of the metal conducting portion 22, thereby outputting a signal indicative of the pressure applied through the metal conducting portion 22 to the contact tract 140.

Figure 17A:
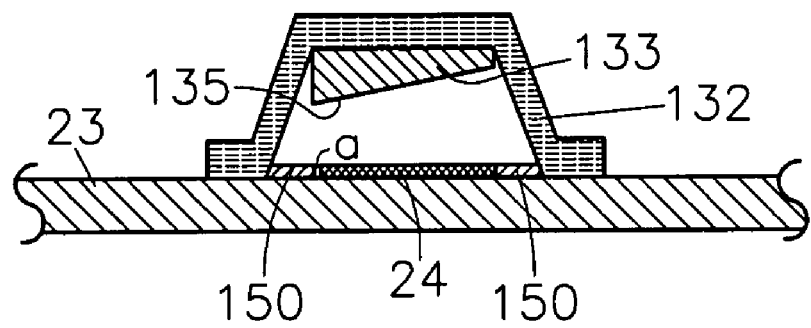
FIG. 17A is a schematic sectional view of a part of a button structure used in a game controller according to a ninth embodiment of the present invention.

Referring to FIG. 17A, the button structure comprises a circuit board 23, two tin plates 150 arranged on the circuit board 23, a resistor 24 connected between the two tin plates 150, a rubber member 132 mounted on the circuit board 23 over the resistors 24 and the tin plates 150, a metal conducting portion 133 fixedly mounted in the rubber member 132 and spaced above the resistor 24. The metal conducting portion 133 has a beveled bottom edge 135 facing the resistor 24. The resistor 24 according to this embodiment is an open-circuit resistor formed of a continual carbon film or continual resistor strip. The button structure according to this embodiment further comprises a frame (not shown) disposed above the rubber member 132, and a button (not shown) vertically movably mounted in the frame and operable to press the rubber member 132 and to further force the metal conducting portion 133 against the resistor 24. When the button is not pressed, the circuit of the resistor 24 and the two tin plates 150 is open. On the contrary, when the button is pressed to force the metal conducting portion 133 against the resistor 24, the circuit of the resistor 24 and the two tin plates 150 is closed.

Figure 17B:
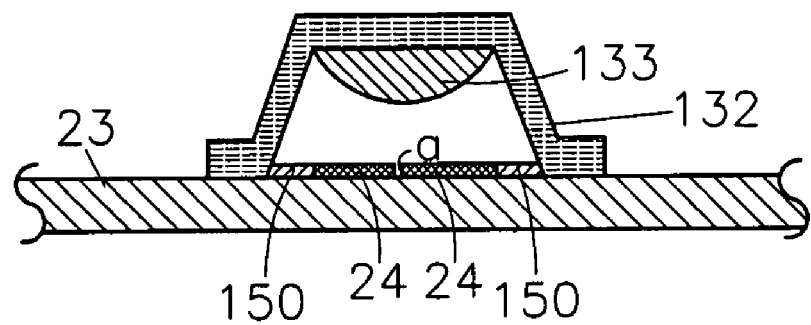
FIG. 17B is a schematic sectional view of a part of a button structure used in a game controller according to a tenth embodiment of the present invention.
Figure 18:
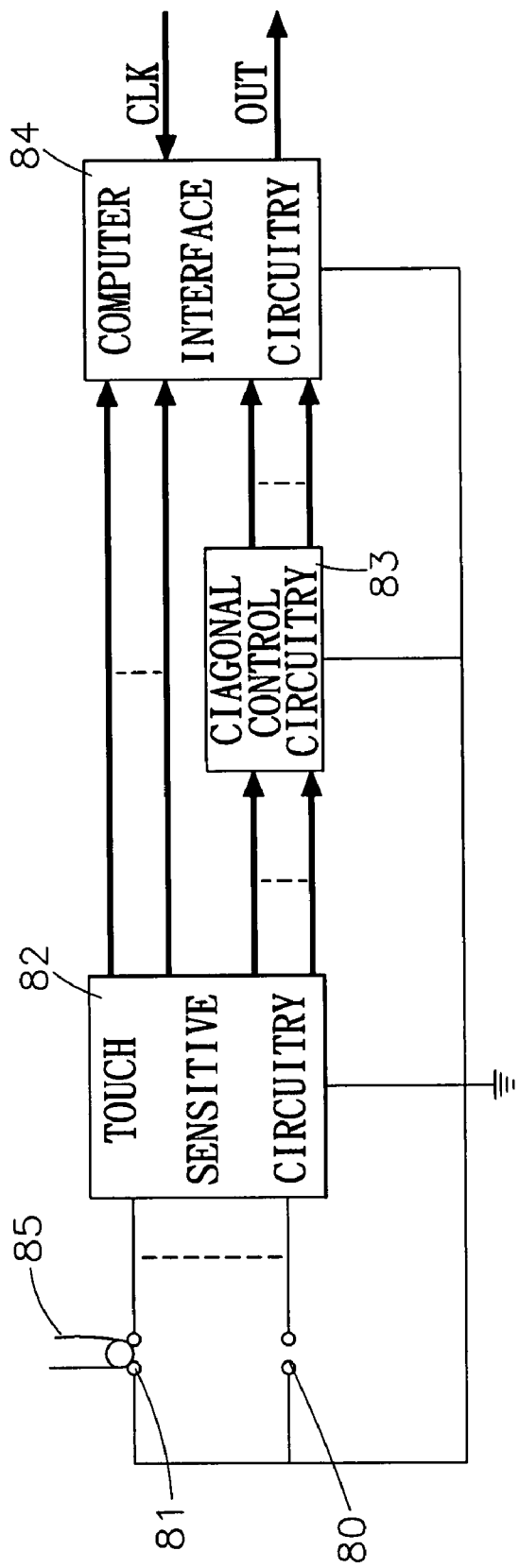
FIG. 18 is a schematic circuit block diagram of a touch-control game controller according to the prior art.

FIG. 17B is substantially similar to FIG. 17A with the exception of the shape of the metal conducting portion. According to this embodiment, the metal conducting portion 133 has a semispherical shape.

In general, a button structure for game controller in accordance with the present invention has the following features and advantages:

1. By means of changing the biasing angle of the button or the pressure applied to the button when pressing the button, the contact area between the metal conducting portion and the resistor or conducting track at the circuit board is relatively changed, and the value of the output signal is also relatively changed to give a corresponding control. The button structure can be made in a single module for easy and quick installation, saving much the cost.

2. The impedance of the resistor used in every resistor must checked to be within a predetermined tolerance value. By means of the use of a continual carbon film to substitute for a conventional resistor, the tolerance test is easy. Through only one single test is OK. When a conventional resistor is used, the tolerance test must be made at last twice.

3. Because of continual carbon films and continual resistor strips have the characteristic of low tolerance value, all buttons in a game controller according to the present invention show uniformity in triggering performance, i.e., when different buttons of the game controller produce approximately an equal value output when they receive a same pressure.

4. By means of the use of a continual resistor strip to substitute for a conventional non-continual resistor, the invention eliminates the drawback of the use of a conventional non-continual resistor strip. When a conventional non-continual resistor strip is used, the distance of the open circuit must be limited to a very small value to prevent electric leakage. When forming a non-continual resistor strip on a circuit board by printing, dispersion of printing material may occur. Either electrical leakage or dispersion of printing material may result in an error output, and an output signal may be produced erroneously when the button is not pressed. The invention eliminates these problems.

5. When a non-continual resistor strip is used, the positioning of the metal conducting portion must be accurately aimed at the open circuit area of the non-continual resistor strip to ensure accurate signal output upon pressing of the button. Because of the advantage of low positioning precision requirement, the use of a continual resistor strip to substitute for a conventional non-continual resistor strip greatly improves the yield rate of game controller.

6. When using a high sensitivity game controller, the game controller may be unable to define every instruction precisely because the area and elasticity of the finger pads of different users or the value of electrical charges carried in the finger pads of different users are different. Further, when playing an exciting game or shooting game, the sweat of the finger may cause a contact error. The invention controls the value of the output signal subject to the biasing angle of the button or the value of pressure applied to the button that controls the contact area between the metal conducting portion and the carbon film or conducting track, assuring high sensitivity and high reliability.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A button structure used in a game controller, comprising:
   a rubber member mounted on a circuit board inside the game controller, said rubber member having a metal conducting portion disposed at a bottom side thereof;
   a continual resistor strip mounted in the circuit board carrying said rubber member and spaced below said metal conducting portion of said rubber member;
   a contact area produced upon contact between said rubber member and said continual resistor strip for causing said continual resistor strip to output a signal corresponding to the dimension of said contact area; and
   a button spaced above said rubber member and biasable to deform said rubber member and to further force said metal conducting portion into contact with said continual resistor strip.

2. The button structure as claimed in claim 1, wherein said continual resistor strip is a carbon film.

3. The button structure as claimed in claim 1, wherein said button has a bottom shaft pivoted to said rubber member.

4. A button structure used in a game controller, comprising:
a package shell formed of a part of said game controller;
a printed circuit board mounted inside said package shell;
a button mounted in said package shell and axially movable relative to said printed circuit board;
drive means mounted on said button in a coaxial manner relative to said button and movable by said button;
a continual resistor strip mounted in said printed circuit board;
a contact area produced between said drive means and said continual resistor strip for causing said continual resistor strip to output a signal corresponding to the dimension of said contact area when said drive means is moved by said button, the dimension of said contact area between said drive means and said continual resistor strip determining the value of the signal outputted by said continual resistor strip.

5. The button structure as claimed in claim 4, wherein said continual resistor strip is a carbon film.

* * * * *